United States Patent
Falcone et al.

(10) Patent No.: US 8,550,226 B2
(45) Date of Patent: Oct. 8, 2013

(54) TRANSMISSION SYNCHRONIZER ASSEMBLY

(75) Inventors: Paulo Falcone, Sao Paulo (BR); Demetrio Vettorazzo Neto, Sao Paulo (BR); Renato Freitas Silva, Sao Paulo (BR); Flavio Gomes Dias, Indaiatuba (BR)

(73) Assignee: GM Global Technology Operations LLC, Detroit, MI (US)

( * ) Notice: Subject to any disclaimer, the term of this patent is extended or adjusted under 35 U.S.C. 154(b) by 270 days.

(21) Appl. No.: 13/012,887

(22) Filed: Jan. 25, 2011

(65) Prior Publication Data

US 2012/0186929 A1    Jul. 26, 2012

(51) Int. Cl.
*F16D 23/06*    (2006.01)
(52) U.S. Cl.
USPC .................. 192/53.34; 192/30 V; 192/209
(58) Field of Classification Search
USPC .................. 192/53.34, 55.3, 55.6, 209, 30 V
See application file for complete search history.

(56) References Cited

U.S. PATENT DOCUMENTS

| | | | | |
|---|---|---|---|---|
| 2,129,342 A | * | 9/1938 | Buchanan | 192/53.34 |
| 3,612,235 A | * | 10/1971 | Ashauer et al. | 192/53.34 |
| 4,828,087 A | * | 5/1989 | Kudo et al. | 192/53.34 |
| 5,036,719 A | * | 8/1991 | Razzacki | 74/339 |
| 5,531,305 A | * | 7/1996 | Roberts et al. | 192/53.332 |
| 2005/0183919 A1 | * | 8/2005 | Folk | 192/48.91 |
| 2009/0314599 A1 | * | 12/2009 | Christoffer et al. | 192/53.34 |

* cited by examiner

*Primary Examiner* — David D Le
*Assistant Examiner* — Huan Le
(74) *Attorney, Agent, or Firm* — Quinn Law Group, PLLC

(57) ABSTRACT

A transmission synchronizer assembly is provided that alleviates noise associated with functional clearances and backlashes. A synchronizer ring is provided that has a periphery with at least one tab extending at least partially radially at the periphery. An annular hub has at least one recess configured to receive the at least one tab to axially align the synchronizer ring with the hub. The recess and the tab define a clearance when the tab is received in the recess. A damping material is provided in the clearance such that the damping material contacts the annular hub when the synchronizer is moved about the axis of rotation relative to the annular hub. Such movement may occur during engagement of an annular sleeve with a gear whose speed is synchronized with the sleeve by the synchronizer ring.

12 Claims, 4 Drawing Sheets

TRANSMISSION SYNCHRONIZER ASSEMBLY

TECHNICAL FIELD

The invention relates to a synchronizer assembly for a transmission.

BACKGROUND

Transmission synchronizer assemblies are used in manual and automatic manual transmissions to bring components to the same speed prior to engaging the components. This prevents driveline torque spikes to provide seamless shifts between speed ratios, increasing occupant comfort. However, some functional clearances are required between components that selectively mesh or otherwise engage, such as between gear teeth of meshing gears. These functional clearances have the potential to create a rattling noise in the transmission as the torque carried by the components varies.

SUMMARY

A transmission synchronizer assembly is provided that alleviates noise associated with functional clearances and backlashes. A synchronizer ring is provided that has a periphery with at least one tab extending at least partially radially at the periphery. An annular hub has at least one recess configured to receive the at least one tab to axially align the synchronizer ring with the hub. The recess and the tab define a clearance when the tab is received in the recess. A damping material is provided in the clearance such that the damping material contacts the annular hub when the synchronizer is moved about the axis of rotation relative to the annular hub. Such movement may occur during engagement of an annular sleeve with a gear whose speed is synchronized with the sleeve by the synchronizer ring.

The damping material is selected to have a compliance that is greater than the compliance of at least one of the tab and the hub. Thus, the hub will contact the damping material when the synchronizer moves angularly about the axis of rotation relative to the hub, reducing noise that could otherwise occur. In one embodiment, the damping material is a thermoplastic.

The above features and advantages and other features and advantages of the present invention are readily apparent from the following detailed description of the best modes for carrying out the invention when taken in connection with the accompanying drawings.

DETAILED DESCRIPTION

Figure 1:
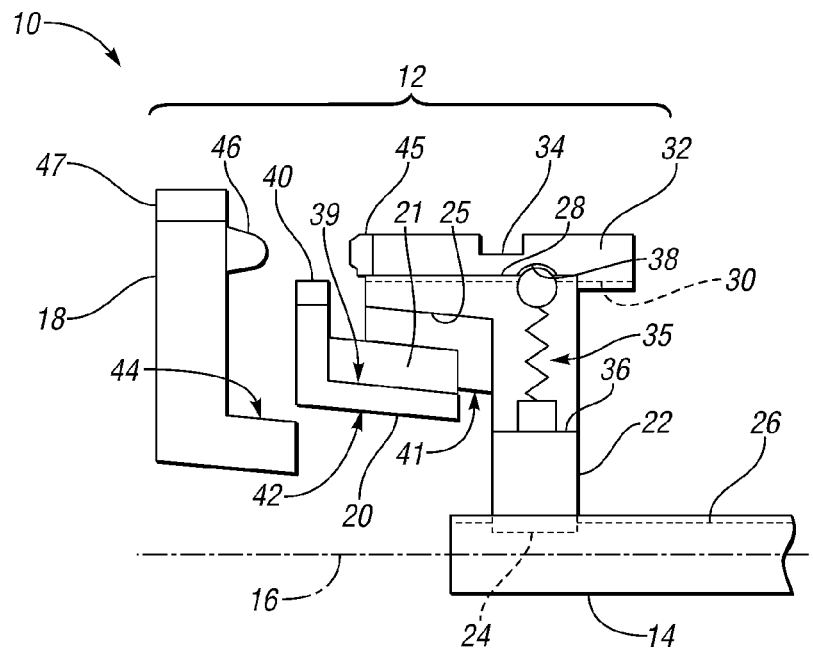
FIG. 1 is a schematic cross-sectional fragmentary illustration of a portion of a transmission having a synchronizer assembly with a synchronizer ring, a hub, a sleeve, and a gear.

Referring to the drawings, wherein like reference numbers refer to like components throughout the several views, FIG. 1 shows a portion of a transmission 10 that includes a synchronizer assembly 12 with a synchronizer ring 20 that ultimately synchronizes the speeds of rotation of a shaft 14 that is rotatable about an axis of rotation 16 and a gear 18 arranged concentrically about the axis of rotation 16. In FIG. 1, only portions of the synchronizer assembly 12 above the axis of rotation 16 are shown. As described herein, the synchronizer ring 20 is provided with features that dampen noise and vibration associated with the synchronization of the speeds of the shaft 14 and the gear 18.

Figure 6:
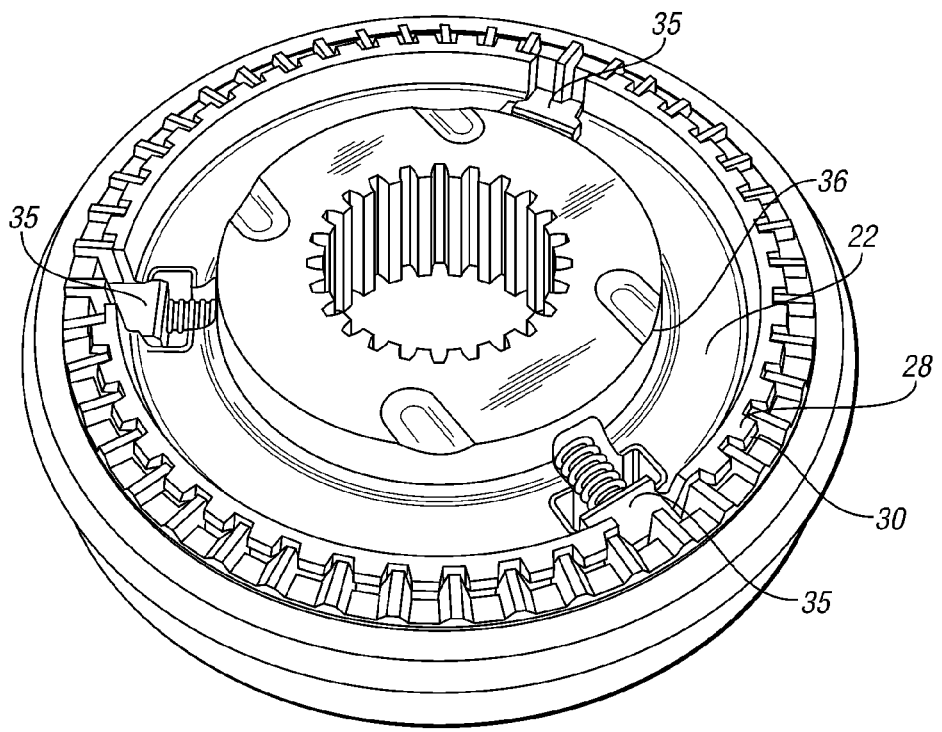
FIG. 6 is a schematic perspective illustration of the hub splined to the sleeve.
Figure 2:
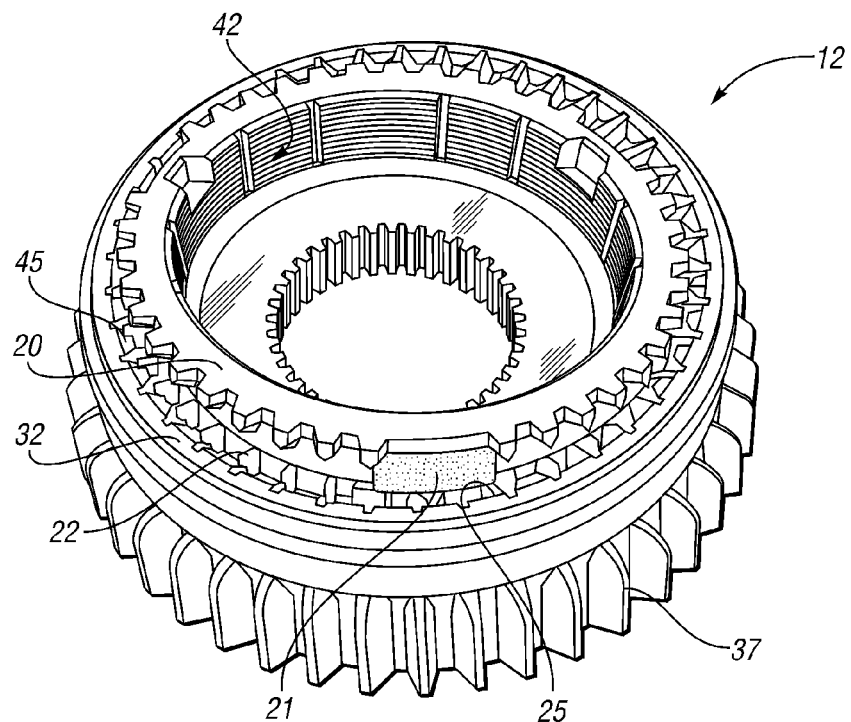
FIG. 2 is a schematic perspective illustration of the synchronizer ring, the hub and the sleeve.

The synchronizer assembly 12 includes an annular hub 22 that has internal splines 24 that mate with external splines 26 of the shaft 14 to connect the hub 22 for common rotation with the shaft 14. The hub 22 also has external splines 28 that mate with internal splines 30 of an annular sleeve 32. The sleeve 32 is thus splined for common rotation with the hub 22, but is configured to be selectively axially movable relative to the shaft 14 and hub 22 by actuation of a shift fork (not shown) that engages a recess 34 of the sleeve 32. As shown in FIGS. 1 and 6, biasing elements 35 are spaced peripherally about a shoulder 36 of the hub 22 and are biased into pockets 38 of the sleeve 32 to establish a neutral position of the sleeve 32 and the synchronizer assembly 12 as shown in FIG. 1. The axial force provided by the shifting fork to move the sleeve 32 to cause engagement of the sleeve 32 and the gear 18 as described below is sufficient to overcome the biasing elements 35. FIG. 2 shows the synchronizer ring 20 fit to the hub 22 with the sleeve 32 surrounding the hub 22. An additional gear 37, not shown in FIG. 1, is shown splined to the sleeve 32 which moves axially relative to the gear 37.

Figure 3:
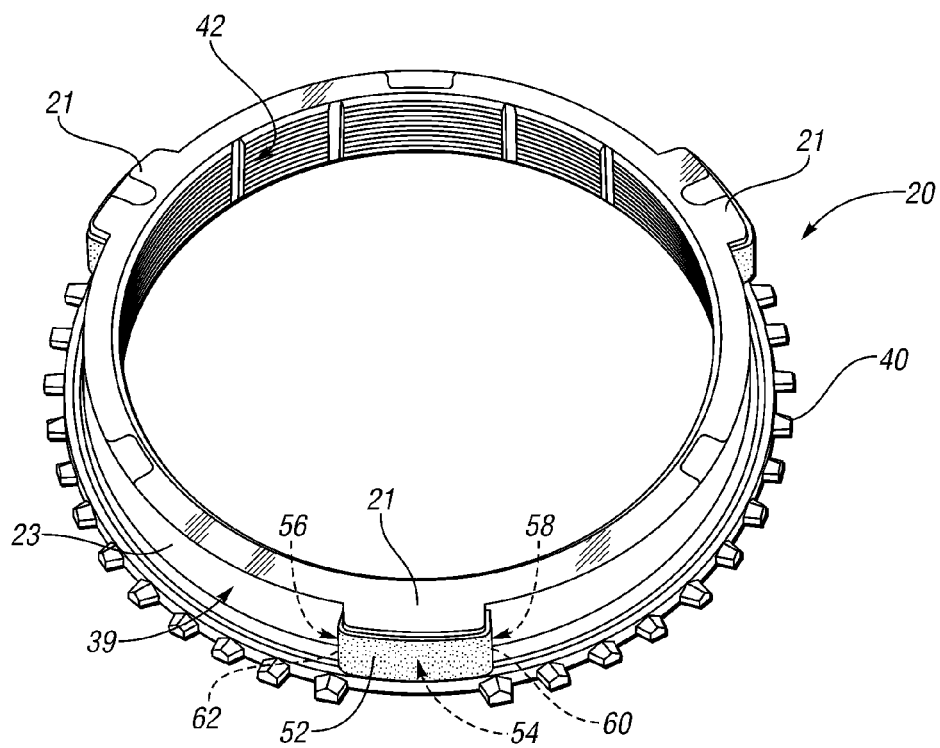
FIG. 3 is a schematic perspective fragmentary illustration of the synchronizer ring.
Figure 4:
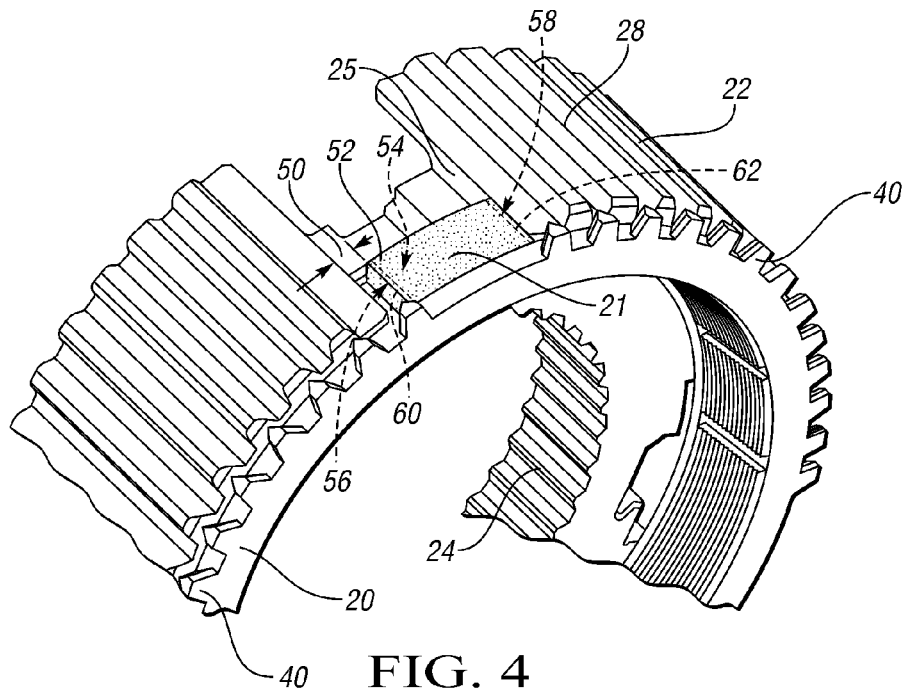
FIG. 4 is a schematic perspective illustration of the synchronizer ring and the hub showing damping material in a clearance between the synchronizer ring and the hub.
Figure 5:
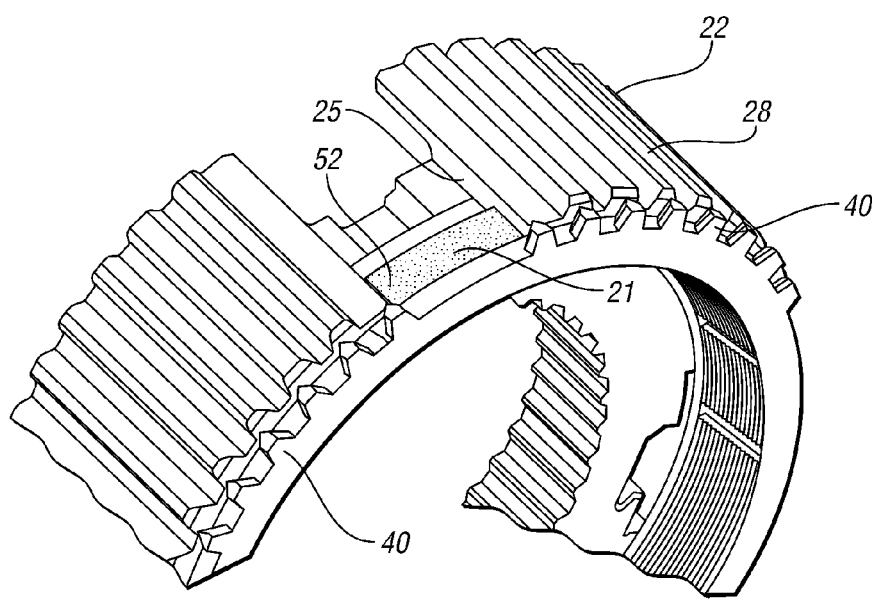
FIG. 5 is a schematic perspective fragmentary illustration of the synchronizer ring and the hub showing the damping material contacting the hub.

The synchronizer ring 20 is axially aligned with the hub 22 by tabs 21 spaced about an external periphery 23 of the ring 20 between different groups of external teeth 40, as best shown in FIGS. 3 through 5. There are no external teeth 40 axially adjacent the tabs 21; that is, the tabs 21 are placed at gaps between groups of the external teeth 40. The tabs 21 fit within recesses 25 defined by the hub 22, shown in FIGS. 4 and 5. Referring again to FIG. 1, as the sleeve 32 is moved axially toward the gear 18, the internal splines 30 engage the external teeth 40 of the synchronizer ring 20 causing an external frustoconical surface 39 of the synchronizer ring 20, best shown in FIG. 3, to contact an internal frustoconical surface 41 of the hub 22 (see FIG. 1), and an internal frustoconical surface 42 of the ring 20 to contact an external frustoconical surface 44 (see FIG. 7) of the gear 18, providing friction to reduce relative rotation between the synchronizer ring 20 and the gear 18 and to synchronize the speed of the gear 18 with the synchronizer ring 20, the hub 22 and the shaft 14. The sleeve 32 continues to move axially so that a set of dog teeth 45 of the sleeve 32 engage a set of dog teeth 46 of the gear 18, completing the engagement and the shift. As used herein, the dog teeth 46 are a first set of dog teeth and the dog teeth 45 are a second set of dog teeth. The gear 18 has gear teeth 47 that can transmit torque between a component meshing with the gear 18 and the shaft 14 when sets of dog teeth 45, 46 are engaged.

Figure 7:
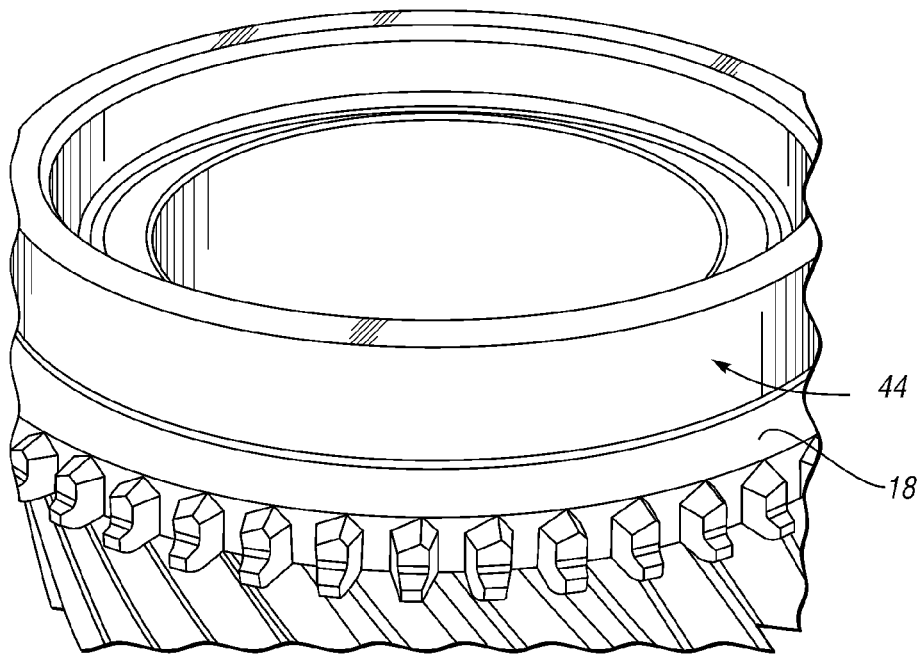
FIG. 7 is a schematic perspective fragmentary illustration of the gear showing an external frustoconical surface which the synchronizer ring contacts.
Figure 8:
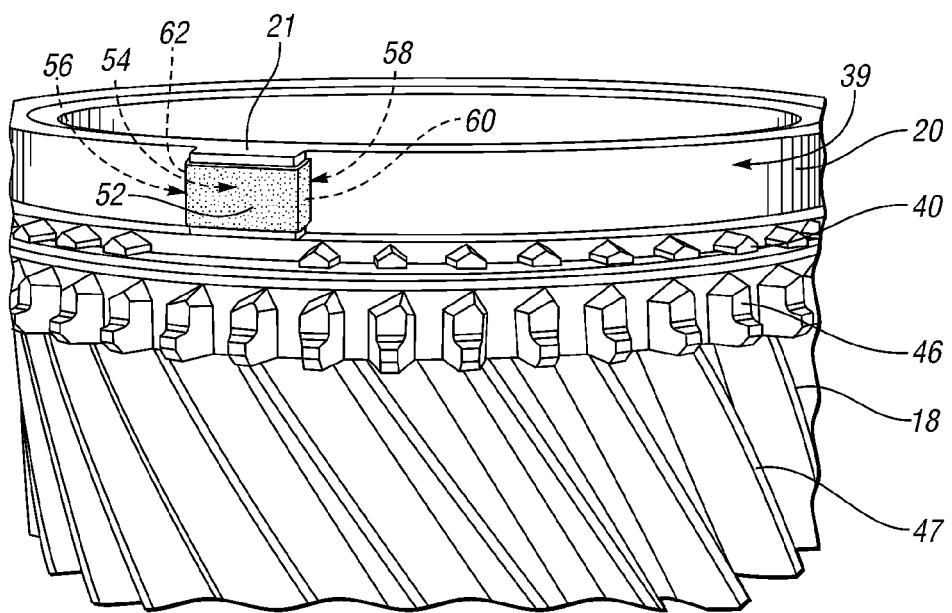
FIG. 8 is a schematic perspective fragmentary illustration of the synchronizer ring contacting the gear.

When the dog teeth 45 engage with the dog teeth 46, there may be a slight angular rotation of the tabs 21 within the recesses 25 of FIG. 2 as the synchronizer ring 20 is pressed against the frustoconical surface 44 of FIGS. 1 and 7. As shown in FIG. 4, each recess 25 is circumferentially wider than the tab 21 within it to provide a functional clearance 50 that allows axial movement of the hub 22 without interfering with the tabs 21. A damping component is provided as a damping material 52 positioned in the clearance 50 to dampen forces of the tab 21 contacting the hub 22 at the recesses 25. In FIGS. 3 and 8, the damping material 52 is shown secured over the tab 21 on a first surface 54, a first side surface 56 and a second side surface 58 at opposing ends 60, 62, respectively, of the first surface 54 of the tab 21. The damping material 52 will thus be in contact with the hub 22 during operation of the synchronizer assembly 12 rather than the tab 21 directly contacting the hub 22. As used herein, a material is "damping material" if it has a compliance greater than the compliance of at least one of the tab 21 and the hub 22. The damping material 52 has a compliance greater than the compliance of either or both of the material of the tabs 21 and the material of the hub 22 at the recesses 25. Thus, the damping material 52 reduces noise and vibration that may be associated with contact between the tabs 21 and the hub 22. In the embodiment shown, the damping material 52 is a thermoplastic that displays good wear resistance when used in the assembly 10. The tabs 21 and the hub 22 are steel.

While the best modes for carrying out the invention have been described in detail, those familiar with the art to which this invention relates will recognize various alternative designs and embodiments for practicing the invention within the scope of the appended claims.

The invention claimed is:

1. A transmission synchronizer assembly comprising:
   a synchronizer ring having a periphery with at least one tab extending at least partially radially at the periphery;
   an annular hub having an axis of rotation and at least one recess configured to receive the at least one tab to axially align the synchronizer ring with the hub; wherein the at least one recess is sufficiently sized so that the annular hub and the at least one tab define an angular clearance between the annular hub and the synchronizer ring that allows relative angular movement of the annular hub and the synchronizer ring about the axis of rotation when the at least one tab is received in the at least one recess; and
   a damping material on an axially-extending surface of the at least one tab in the angular clearance such that the damping material contacts an axially-extending surface of the annular hub that faces the axially-extending surface of the at least one tab when the synchronizer is moved about the axis of rotation relative to the annular hub.

2. The transmission synchronizer assembly of claim 1, wherein the damping material is a thermoplastic material.

3. The transmission synchronizer assembly of claim 1, wherein the synchronizer ring has teeth spaced about the periphery; and wherein the at least one tab is positioned between some of the teeth.

4. The transmission synchronizer assembly of claim 1, wherein the damping material is secured to the axially-extending surface of the at least one tab facing the annular hub in the recess.

5. The transmission synchronizer assembly of claim 4, wherein the tab has a first surface spanning at least a portion of the periphery and a first and a second side surface extending at least partially axially from opposing ends of the first surface; and wherein the axially-extending surface of the at least one tab facing the axially-extending surface of the annular hub in the at least one recess is one of the first side surface and the second side surface.

6. A transmission synchronizer assembly for synchronizing the rotational speeds of a shaft and a gear having a first set of dog teeth, the assembly comprising:
   a synchronizer ring having a periphery with at least one tab extending at least partially radially at the periphery;
   an annular hub connected for common rotation with the shaft and having an axis of rotation and at least one recess containing the at least one tab to axially align the synchronizer ring with the hub; wherein the at least one recess is sufficiently sized so that the annular hub and the at least one tab define an angular clearance between the at least one tab and the annular hub that allows relative angular movement of the annular hub and the synchronizer ring about the axis of rotation;
   a damping material on an axially-extending surface of the at least one tab in the angular clearance;
   a sleeve having a second set of dog teeth configured to mesh with the first set of dog teeth; wherein the sleeve is splined to the hub such that the sleeve is selectively axially movable relative to the hub to cause the synchronizer ring to contact the gear to synchronize rotational speeds of the shaft and the gear prior to the second set of dog teeth engaging with the first set of dog teeth; and
   wherein the damping material contacts an axially-extending surface of the annular hub that faces the axially-extending surface of the at least one tab when the synchronizer is moved about the axis of rotation relative to the annular hub by the axial movement of the sleeve.

7. The transmission synchronizer assembly of claim 6, wherein the damping material is secured to the axially-extending surface of the at least one tab facing the annular hub in the recess.

8. The transmission synchronizer assembly of claim 6, wherein the damping material is a thermoplastic material.

9. The transmission synchronizer assembly of claim 6, wherein the tab has a first surface spanning at least a portion of the periphery and a first and a second side surface extending at least partially axially from opposing ends of the first surface; and wherein the axially-extending surface of the at least one tab that faces the axially-extending surface of the annular hub in the at least one recess is one of the first side surface and the second side surface.

10. The transmission synchronizer assembly of claim 6, wherein the synchronizer ring has external teeth spaced about the periphery; and wherein the at least one tab is positioned between some of the external teeth of the synchronizer ring.

11. The transmission assembly of claim 6, wherein the synchronizer ring has an external frustoconical surface and an internal frustoconical surface; wherein the at least one tab extends radially from the external frustoconical surface; wherein the annular hub has another internal frustoconical surface configured to interface with the external frustoconical surface of the synchronizer ring; and wherein the gear has another external frustoconical surface configured to interface with the internal frustoconical surface of the synchronizer ring.

12. A transmission synchronizer assembly for synchronizing the rotational speeds of a shaft and a gear having a first set of dog teeth, the assembly comprising:
   a synchronizer ring having a periphery with at least one tab extending at least partially radially at the periphery, and with external teeth spaced about the periphery; wherein the at least one tab is positioned between some of the external teeth of the synchronizer ring;

an annular hub connected for common rotation with the shaft and having at least one recess containing the at least one tab to axially align the synchronizer ring with the hub; wherein the at least one recess and the at least one tab define an angular clearance between the at least one tab and the at least one recess;

wherein the synchronizer ring has an external frustoconical surface and an internal frustoconical surface; wherein the at least one tab extends radially from the external frustoconical surface; wherein the annular hub has another internal frustoconical surface configured to interface with the external frustoconical surface of the synchronizer ring; wherein the gear has another external frustoconical surface configured to interface with the internal frustoconical surface of the synchronizer ring;

a thermoplastic damping material in the clearance secured to an axially-extending surface of the at least one tab facing an axially-extending surface of the annular hub in the angular clearance;

a sleeve having a second set of dog teeth configured to mesh with the first set of dog teeth; wherein the sleeve is splined to the hub such that the sleeve is selectively axially movable relative to the hub to cause the synchronizer ring to contact the gear to synchronize rotational speeds of the shaft and the gear prior to the second set of dog teeth engaging with the first set of dog teeth; and wherein the damping material contacts the axially-extending surface of the annular hub when the synchronizer is moved about the axis of rotation relative to the annular hub by the axial movement of the sleeve.

* * * * *